United States Patent Office 3,446,512
Patented May 27, 1969

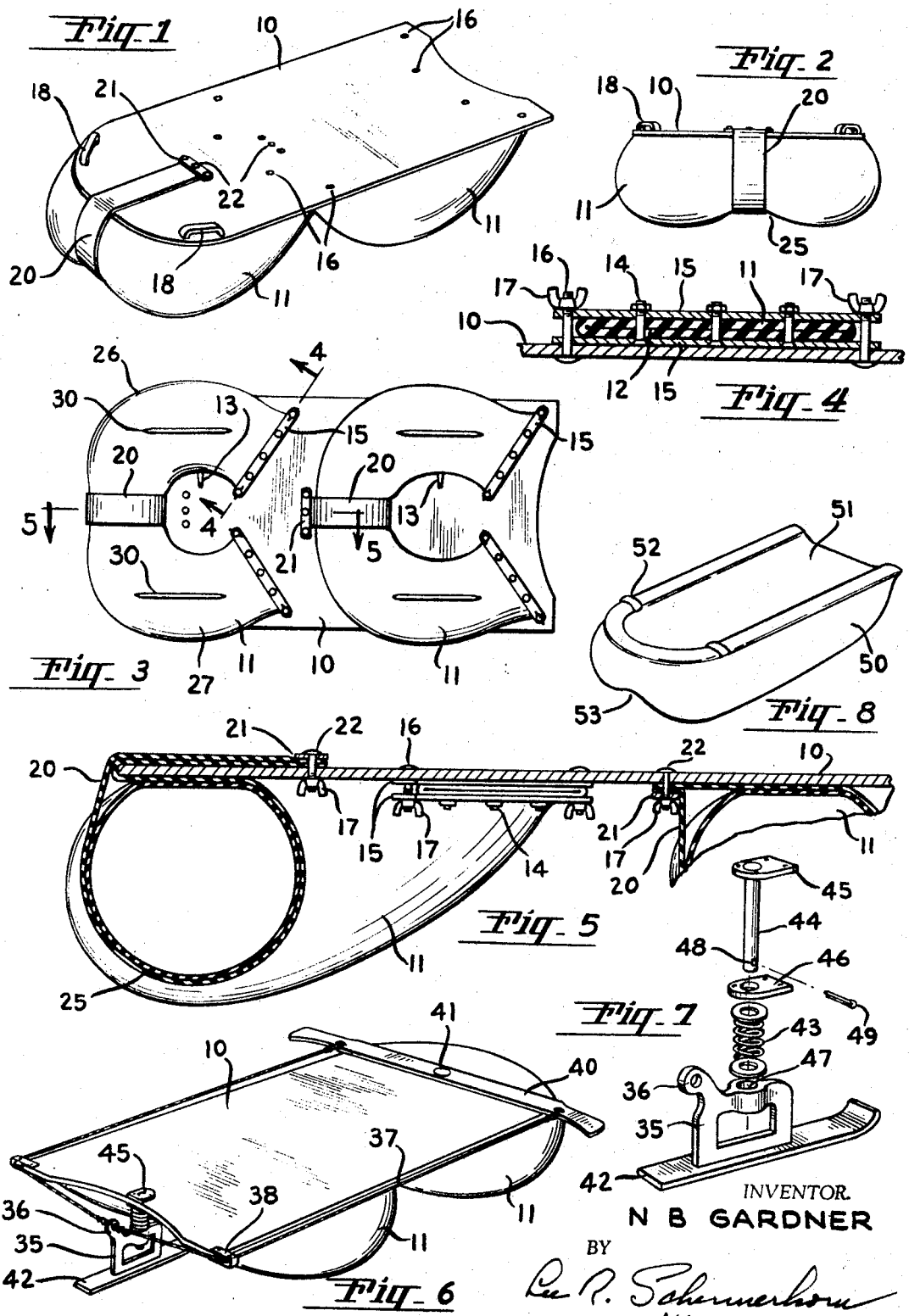

3,446,512
SNOW SURFER
N B Gardner, 1501 S. Toutle Road,
Toutle, Wash. 98649
Filed Sept. 11, 1967, Ser. No. 666,881
Int. Cl. B62b 13/02
U.S. Cl. 280—12           7 Claims

ABSTRACT OF THE DISCLOSURE

A sled having runners formed from the rubber inner tube of an automobile tire. The tube is cut and secured to the under side of a deck board in semi-circular, U or horseshoe shape, the cut ends being sealed and the tube inflated through its valve fitting. Two or more such tubes may be used in tandem. Instead of using inner tubes, the inflatable runners may be specially molded or molded integrally with a rubber deck to make a one-piece sled.

BACKGROUND OF THE INVENTION

This invention relates to a sled having runners in the form of inflated rubber tubes.

Rubber inner tubes from auto tires have previously been used as snow coasters but such devices being ring-shaped have no directional characteristics or steerability as desired in a sled. It has been found, however, that an inflated resilient rubber tube will slide faster on a snow slope than a sled having rigid runners. Rubber tubes have also been used for various types of flotation devices where resilience, coefficient of friction and slidability have not been factors to be considered.

SUMMARY OF THE INVENTION

In the present invention the low coefficient of friction and easy slidability on a snow surface of resilient, pneumatic rubber tubes areutilized to advantage by forming the tubes as sled runners so that they will have the directional properties desired in a sled. A very inexpensive sled may be made from a deck board and the inner tube from an auto tire. The tube is cut and the cut ends sealed so that the tube may be inflated. The cut ends are spaced apart to impart a horseshoe configuration to the tube which is then secured to the under side of the deck board. The cut ends are placed in trailing position and the middle portion of the tube is secured to the front end of the deck board by a constrictive strap which divides the tube into a pair of pneumatic runners extending along opposite sides of the deck board. Preferably, two such tubes are secured to the deck board in tandem. Steering may be accomplished by shifting the weight of the rider or a spring loaded rudder may be provided if desired.

Alternatively, the pneumatic runners may be specially molded in desired shapes and a one-piece sled may be made by molding a U-shaped rubber tube integrally with a rubber deck.

Objects of the invention are to provide a sled having resilient pneumatic runners in the form of rubber tubes, to provide a sled having runners made from the inner tubes of auto tires, to provide a sled having runners made of U-shaped inflated rubber tubes and to provide a one-piece sled having pneumatic rubber tube runners molded integrally with a rubber deck.

The invention will be better understood and the foregoing and other objects and advantages will become apparent from the following description of certain preferred embodiments illustrated on the accompanying drawing.

BRIEF DESCRIPTION OF THE DRAWING

FIGURE 1 is a perspective view showing a sled embodying the principles of the invention;

FIGURE 2 is a front elevation view of the sled;
FIGURE 3 is a bottom plan view;
FIGURE 4 is an enlarged view on the line 4—4 in FIGURE 3;
FIGURE 5 is an enlarged view on the line 5—5 in FIGURE 3;
FIGURE 6 is a perspective view showing a sled as in FIGURE 1 provided with a rudder;
FIGURE 7 is an exploded view showing the rudder construction; and
FIGURE 8 is a perspective view showing a one-piece sled having a rubber tube molded integrally with a rubber deck.

DESCRIPTION OF THE PREFERRED EMBODIMENTS

The sled in FIGURE 1 comprises a deck board 10 of suitable material such as a board, plywood, Fiberglas, plastic or stiff rubber and a pair of inner tubes or sections of inner tubes 11 from passenger car or truck tires. Each inner tube is cut to form a U- or horseshoe-shaped tube and the walls of the tube at each cut end are flattened and cemented or vulcanized together as indicated at 12 in FIGURE 4 so that the tubes may be inflated through their valve fittings 13. Each cut end is clamped by bolts 14 between a pair of brackets 15, which brackets are in turn secured to the under side of deck board 10 by bolts 16, the cut ends being spaced apart approximately in the configuration shown in FIGURE 3.

The cut ends of the tubes 11 are oriented in trailing position and the center front portion of each tube is secured to the deck board by a constrictive strap 20. The tubes 11 are interchangeable from front to rear and vice versa and may be turned over when worn by removing wing nuts 17 from bolts 16 and removing straps 20. The deck board is also preferably equipped with handles 18.

Each strap 20 loops around the tube as shown in FIGURE 5 and has its ends clamped under a bracket 21 which is secured to the deck board by bolts 22. Strap 20 reduces the diameter of the tube in its central front portion and holds the upper side of the tube snugly against the bottom of the deck board so that the under side of the central portion is somewhat elevated as indicated at 25. This divides the tube into two generally longitudinally directed runners 26 and 27 on opposite sides of the deck board. The under sides of these runners may be reinforced by vulcanizing rubber strips 30 to the tubes as shown. These strips are oriented parallel with the longitudinal axis of the sled and serve as auxiliary runner elements to improve the directional characteristics of the sled as well as to improve the abrasion resistance of the tubes.

If desired, the under side of the deck board may be shaped to fit the contours of the tubes.

Although at least two tubes 11 are preferred, a small sled may be made with a single large tube, if desired. In such case, the clamp bars 15 may be positioned farther rearwardly from strap 20 to elongate the runner portions 26 and 27 and reduce the overall width to some extent.

Instead of using inner tubes, the pneumatic runners may be specially molded to the desired shape. In such case, the auxiliary runner elements 30 are molded integrally with the tubes.

In FIGURE 6 the sled of FIGURE 1 is equipped with a rudder 35 to steer the sled. The rudder has a tiller arm 36 connected to ropes 37 which are trained through pulleys 38 to a rudder bar 40 pivotally mounted on the front end of the deck board at 41.

FIGURE 7 shows a preferred form of spring loaded rudder having a ski-shaped runner 42 which is pressed against the snow by a compression spring 43 on shaft 44. The upper end of the shaft is welded to attaching bracket 45 in FIGURE 6 on top of deck board 10 and passes through bracket 46 on the bottom of the deck board. The lower end of the shaft extends through an opening 47 in the upper part of the rudder hinge member 35 and is apertured at 48 to receive cotter key 49. Spring 43 will compress along with tubes 11 when weight is applied to the sled.

FIGURE 8 shows a modification having a one-piece form of construction. In this embodiment a single U-shaped rubber tube 50 is molded integrally with a rubber deck member 51. Hand grips 52 are molded integrally with the deck and the tube 50 is equipped with a valve fitting 13, not shown, as in FIGURE 3. Instead of using a strap 20 to divide the front portion of the tube into two runners, the tube is preferably molded to the shape shown having a constricted portion at 52 which is elevated a distance above the bottom surface of the longitudinal runner portions. This sled may also be provided with a spring loaded rudder as shown in FIGURE 6 or it may be steered by merely shifting the body weight from one side to the other or by the rider dragging one foot.

These various forms of sled construction illustrated and described may also be utilized in a bobsled. By mounting an outboard marine motor or a wind motor, the sled may be used as a water runabout or swamp sled.

Having now described my invention and in what manner the same may be used, what I claim as new and desire to protect by Letters Patent is:

1. A sled comprising a substantially rigid deck member extending to the front end of the sled, and a pair of runners on said deck member formed from a U-shaped resilient pneumatic tube, said tube having a mid-portion extending across the width of said deck member at its front end and having end portions extending rearwardly along opposite sides of said deck member with laterally spaced apart trailing ends on opposite sides of said deck member, the central front portion of said tube being constricted and its under side elevated by said constriction dividing said tube effectively into two spaced apart runners.

2. A sled as defined in claim 1 including auxiliary runner elements on said rearwardly extending end portions of said tube.

3. A sled as defined in claim 1, said deck member and tube being integrally molded to form a one-piece sled.

4. A sled as defined in claim 1, said constriction being formed by a strap securing said tube to said deck member.

5. A sled as defined in claim 1 including means securing said trailing ends and central front portion of said tube to said deck member.

6. A sled as defined in claim 1, said tube comprising a vehicle tire inner tube cut to horseshoe shape with the cut ends closed so that the tube may be inflated.

7. A sled as defined in claim 6, said deck member having two of said inner tubes mounted thereon in tandem.

References Cited

UNITED STATES PATENTS

| | | | |
|---|---|---|---|
| 1,345,825 | 7/1920 | Beau | 280—12 |
| 3,080,584 | 3/1963 | Brown | 280—12 |
| 3,156,483 | 11/1964 | See | 280—18 |

FOREIGN PATENTS 844,483    9/1962    Italy.

RICHARD J. JOHNSON, *Primary Examiner.*

U.S. Cl. X.R.

9—310; 280—18